United States Patent [19]

Masui et al.

[11] Patent Number: 5,759,594
[45] Date of Patent: Jun. 2, 1998

[54] MOLD ASSEMBLY FOR PRODUCING FIBER-REINFORCED THERMOPLASTIC RESIN MOLDED ARTICLE LAMINATED WITH SKIN MATERIAL

[75] Inventors: Syohei Masui, Soraku-gun; Yuji Kobayashi, Chiba; Satoru Funakoshi, Osaka; Katsuhiro Nagayama, Chiba; Masami Fujimaki, Chiba; Hiroyuki Yoshitake, Chiba, all of Japan

[73] Assignees: Sumitomo Chemical Company, Ltd., Osaka; Kawasaki Steel Corp., Chiba, both of Japan

[21] Appl. No.: 686,745

[22] Filed: Jul. 26, 1996

[30] Foreign Application Priority Data

Jul. 27, 1995 [JP] Japan ..................... 7-191423

[51] Int. Cl.$^6$ ................ B29C 43/20; B29C 43/40
[52] U.S. Cl. ................ 425/510; 156/268; 264/163; 425/289; 425/292; 425/806
[58] Field of Search ............ 156/268; 425/510, 425/292, 289, 806; 264/163, 161

[56] References Cited

U.S. PATENT DOCUMENTS

| | | | |
|---|---|---|---|
| 3,466,214 | 9/1969 | Polk et al. | 425/510 |
| 3,995,984 | 12/1976 | Fetherson et al. | 425/398 |
| 4,692,108 | 9/1987 | Cesano | 425/292 |
| 4,911,873 | 3/1990 | Kuzuya et al. | 264/163 |

FOREIGN PATENT DOCUMENTS

| | | |
|---|---|---|
| 0 272 635 A2 | 6/1988 | European Pat. Off. . |
| 2 364 755 | 4/1978 | France . |
| 23 53 460 | 4/1975 | Germany . |
| 24 16 514 | 10/1975 | Germany . |
| 62-41858 | of 0000 | Japan . |
| 57-2714 | 1/1982 | Japan ............ 425/289 |
| 57-133019 | 8/1982 | Japan . |
| 62-19430 | 1/1987 | Japan . |
| 4-331137 | 11/1992 | Japan . |
| 6-106555 | 4/1994 | Japan . |
| 2195940 | 4/1988 | United Kingdom ....... 425/289 |

*Primary Examiner*—Robert Davis
*Attorney, Agent, or Firm*—Cushman Darby & Cushman IP Group of Pillsbury Madison & Sutro, LLP

[57] ABSTRACT

A mold assembly for producing a fiber-reinforced thermoplastic resin molded article laminated with a skin material comprises: a first mold having a first cavity face; a second mold having an indentation whose bottom surface forms a second cavity face; a driving unit for reciprocating the mold connected thereto; and a cutting blade, attached to the first mold, having a cutting edge opposed to the second cavity face of the second mold, the cutting edge being relatively moved, at closing operation, along an inner peripheral side surface of the second mold with a predetermined clearance with respect to the inner peripheral side surface.

18 Claims, 6 Drawing Sheets

MOLD ASSEMBLY FOR PRODUCING FIBER-REINFORCED THERMOPLASTIC RESIN MOLDED ARTICLE LAMINATED WITH SKIN MATERIAL

BACKGROUND OF THE INVENTION

1. Field of the Invention

The present invention relates to a mold assembly and method for producing a thermoplastic resin molded article or, in particular, a fiber-reinforced thermoplastic resin molded article whose one surface is laminated with a skin material.

2. Related Background Art

Since porous fiber-reinforced thermoplastic resin molded articles are lightweight and excellent in terms of strength, they are widely used for interior automotive parts (e.g., a door trim, a rear trim, and an instrument panel), interior and exterior parts of home electronic equipments, building materials, and the like. Conventionally, as a method for producing such a porous fiber-reinforced thermoplastic resin molded article, a so-called expansion molding method has been known. According to this expansion molding method, initially, a stampable sheet, i.e., a fiber-reinforced thermoplastic resin sheet, is preheated so as to be expanded in the thickness direction thereof. Thereafter, thus expanded sheet is supplied to between upper and lower molds while maintaining the preheated state, pressed between the molds, and then cooled. In this case, the closing clearance between the upper and lower molds is set to a value which is greater than the thickness of the fiber-reinforced thermoplastic resin sheet before preheating but smaller than the thickness of the expanded sheet. Thus, a porous fiber-reinforced thermoplastic resin molded article having a thickness greater than the thickness of the fiber-reinforced thermoplastic resin sheet before preheating is obtained.

The surface of the porous fiber-reinforced thermoplastic resin molded article produced by such an expansion molding method tends to be embossed with its reinforcing fiber from the inside, thereby deteriorating its outer appearance and feel. Accordingly, when a thermoplastic resin molded article is used as interior automotive parts, it is generally used with its surface being laminated with a skin material. As a method of laminating a skin material on the surface of the thermoplastic resin molded article, there has been known a method in which, a step of making the skin material and the fiber-reinforced thermoplastic resin sheet, which has been expanded by preheating, overlap with each other is added to the above-mentioned expansion molding method, whereby thus overlapping materials are pressed between the upper and lower molds and laminated together (Japanese Patent Application Laid-Open Gazette No. Hei 4-331137 (331137/92)). According to this method, a fiber-reinforced thermoplastic resin molded article with a skin material having a shape substantially the same as that of the cavity space between the closed molds can be manufactured.

Here, there remain unnecessary edge portions in the molded article immediately after being taken out from the molds. These portions are not portions to be press-molded between the molds but portions which are mainly used for supplying the stampable sheet and the skin material to between the molds and for holding these materials at the time of closing the molds. Accordingly, in general, these unnecessary edge portions are cut off from the molded article immediately after being taken out from the molds, or the edge portion of the stampable sheet is cut off alone while the edge portion of the skin material is left. The latter technique, in particular, is effected so as to bend the edge portion of the skin material such that it is disposed at the rear side of the molded article in order to adjust the appearance of the molded article with a skin material at the edge portion.

Conventionally, as a method of cutting off the edge portion of the stampable sheet alone simultaneously with the closing of molds, a method disclosed in Japanese Patent Application Laid-Open Gazette No. Hei 6-106555 (106555/94) has been known. According to the method disclosed in this publication, a cutting ring-like planar article is placed between the stampable sheet and the skin material disposed between the upper and lower molds. Then, when the upper mold is descended in order to effect a closing operation, the cutting planar article is descended as being urged by the upper mold, whereby the inner rim of the cutting planar article slides on the outer peripheral side surface of the lower mold. Since the edge portion of the stampable sheet is positioned below the cutting planar article and disposed around the lower mold, when the cutting planar article descends along the outer peripheral side surface of the lower mold, the edge portion of the stampable sheet is sheared between the planar article and the lower mold. This method, however, is complicated in terms of operation and has not been considered industrially advantageous.

SUMMARY OF THE INVENTION

The inventors have found that the above-mentioned conventional method may have the following problems. Namely, the method disclosed in Japanese Patent Application Laid-Open Gazette No. Hei 6-106555 may be problematic in that it is necessary for the cutting planar article to be accurately positioned with respect to the lower mold and that such positioning must be effected for each molding operation. Accordingly, as mentioned above, the operation becomes complicated, thereby making the method industrially disadvantageous.

Therefore, it is an object of the present invention to provide a mold assembly for producing a fiber-reinforced thermoplastic resin molded article laminated with a skin material, which can easily cut off the edge portion of the thermoplastic resin sheet alone at the time of closing, without using a cutting planar article such as that mentioned above, while leaving the edge portion of the skin material.

It is another object of the present invention to provide a method for efficiently producing a fiber-reinforced thermoplastic resin molded article laminated with a skin material by using the above-mentioned mold assembly of the present invention.

The present invention provides a mold assembly for pressing a fiber-reinforced thermoplastic resin sheet and a skin material, while they overlap each other, thereby producing a fiber-reinforced thermoplastic resin molded article laminated with a skin material having a predetermined shape, which comprises:

- a first mold having a first cavity face which is to be abutted to the fiber-reinforced thermoplastic resin sheet;
- a second mold having an indentation whose bottom surface forms a second cavity face to which the skin material is to be abutted and forming, at a closing operation, a cavity space between the first and second cavity faces as the first mold is inserted into the indentation;
- a driving unit, connected to at least one of the first and second molds, for reciprocating the mold connected thereto between an open position where the first and second molds are in an open state and a closed position where the molds are in a closed state; and a cutting blade, attached to the first mold, having a cutting edge opposed to the second cavity face of the second mold, while the cutting edge is relatively movable, at the closing operation, along an inner peripheral side surface of the second mold with a predetermined clearance with respect to the inner peripheral side surface.

Also, the method for producing a fiber-reinforced thermoplastic resin molded article laminated with a skin material in accordance with the present invention using the above-mentioned mold assembly comprises the steps of:

preheating a fiber-reinforced thermoplastic resin sheet to a temperature not lower than the melting temperature of a matrix resin of the sheet so as to expand the sheet in the thickness direction thereof;

supplying the preheated thermoplastic resin sheet and the skin material, while maintaining the preheating temperature of the sheet, to between the first and second molds which are in an open state, such that the sheet and the skin material are respectively opposed to the first and second molds; and moving at least one of the first and second molds to the other so as to attain a closed state, thereby pressing the preheated thermoplastic resin sheet and the skin material between the first and second molds and laminating the sheet and the skin material together, while cutting off the thermoplastic resin sheet alone by the cutting blade.

In accordance with the present invention, simultaneously with the closing operation, unnecessary portions, i.e., edge portions, of the thermoplastic resin sheet can be cut off alone.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
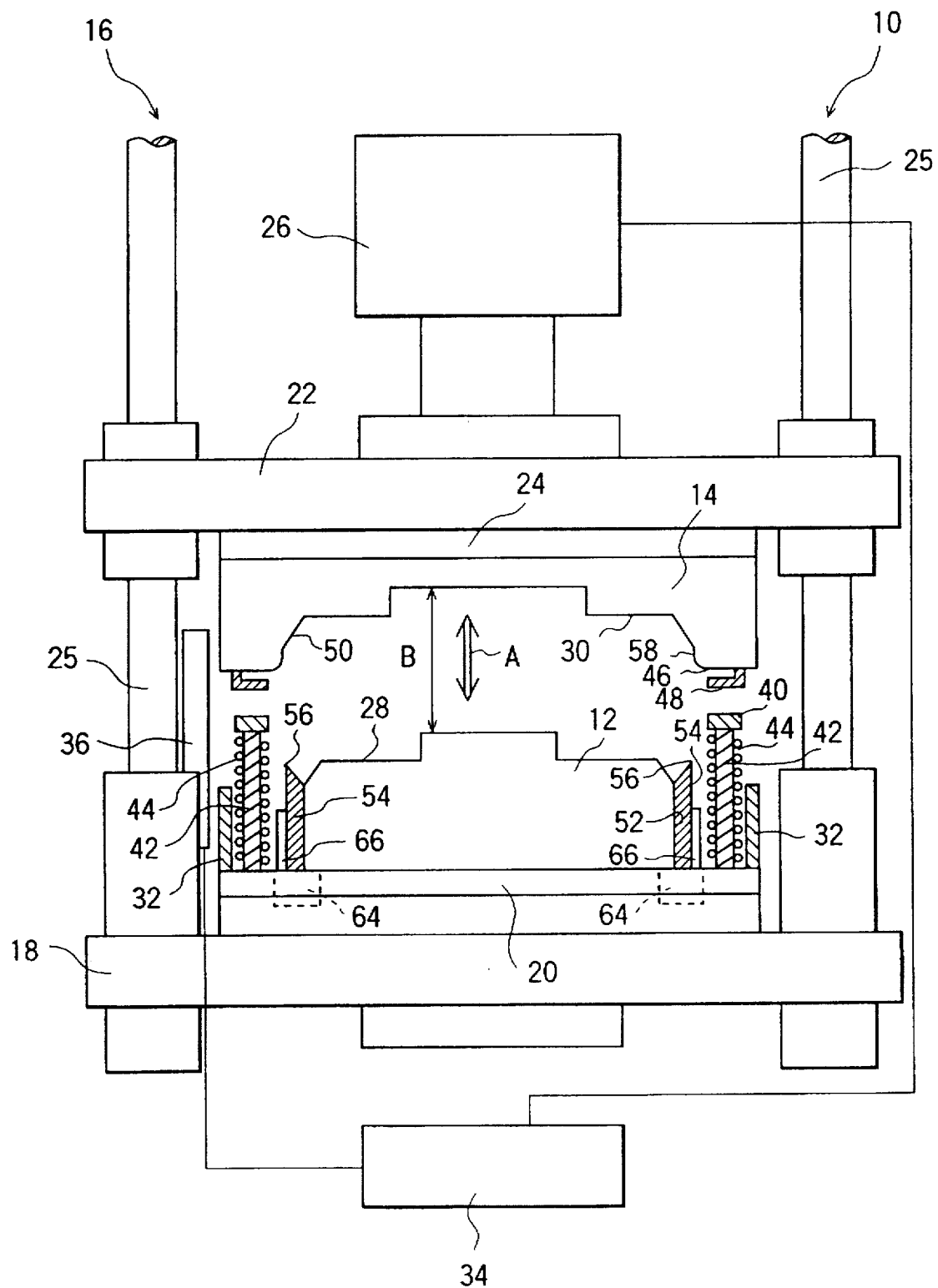
FIG. 1 is a schematic view showing a mold assembly in accordance with the present invention.

In the following, the present invention will be described in detail with reference to the accompanying drawings. In the drawings, elements identical or equivalent to each other are referred to with marks identical to each other.

First, explanation will be provided for the mold assembly in accordance with the present invention which is used for producing a fiber-reinforced thermoplastic resin molded article laminated with a skin material.

FIG. 1 schematically shows a preferable embodiment of the mold assembly in accordance with the present invention. As shown in FIG. 1, a mold assembly 10 comprises a first mold 12 and a second mold 14 which are attached to a press unit 16. In FIG. 1, the first mold or stationary mold 12 is fixed to a fixed frame 18 of the press unit 16 by way of a mount 20. The second mold or movable mold 14, on the other hand, is disposed at a position vertically above the first mold 12 and fixed to a movable frame 22 of the press unit 16 by way of a mount 24. The movable frame 24 is connected to the fixed frame 18 by way of a connecting rod 25 so as to be movable up and down in the vertical direction. A driving unit 26 is connected to the movable frame 22. As the driving unit 26 is controlled, the movable frame 22 and, accordingly, the second mold 14 can be reciprocated in the vertical direction, i.e., direction of arrow A in FIG. 1. Here, the driving unit 26 for driving the second mold 14 is not restricted in particular and may be a hydraulic driving unit, for example.

The first mold 12 and second mold 14 respectively have cavity faces 28 and 30 opposed to each other and corresponding to the shape of a desired product. When the first mold 12 and the second mold 14 are closed, the cavity faces 28 and 30 define a cavity space therebetween which coincides with the outer shape of the desired molded article. Also, when necessary, irregularities for forming a three-dimensional pattern such as grains on the surface of the skin material may be provided in a part of or the whole cavity face 30 of the second mold 14. Without being restricted in particular, the material for the molds 12 and 14 can be appropriately selected from various kinds of metal materials, ceramics, wood, resins, and the like depending on the shape and surface state required. In general, a metal material is used therefor.

The second mold 14 can be moved, by the press unit 16, between (i) an open position where a cavity clearance (B in FIG. 1) between the cavity face 28 of the first mold 12 and the cavity face 30 of the second mold 14 is maintained in a state (open state) in which the molded article can be taken out from between the first and second molds 12 and 14 and (ii) a closed position where the cavity clearance B is maintained in a state (closed state) in which it substantially matches the thickness of the desired molded article. In the depicted embodiment, a stopper 32 for limiting the downward movement of the second mold 14 is attached to the mount 20 on the fixed frame 18 such that the second mold 14 is accurately disposed at the closed position. Here, the first and second molds 12 and 14 in FIG. 1 are in the open state.

To the driving unit 26 for the press unit 16, a control unit 34 for controlling them is connected. When controlling the actuation of the driving unit 26 for the press unit 16, the control unit 34 preferably senses that the second mold 14 has attained a predetermined position with respect to the first mold 12 before controlling the driving unit 26. In the mold assembly 10 shown in FIG. 1, a position sensor 36 for the second mold 14 is disposed beside the first and second molds 12 and 14 while also being connected to the control unit 34. Here, the position sensor 36 is not restricted in particular, and a sensor which detects the position of the second mold 14 mechanically, electrically, or optically may be used, for example.

Around the first mold 12, there is disposed a clamp frame or support member 40 for supporting a fiber-reinforced thermoplastic resin sheet which becomes a material for the molded article to be manufactured. The clamp frame 40 is preferably a continuous ring but may be discontinuous. This clamp frame 40 is supported by a plurality of supporting rods 42 which are attached to the mount 20 on the fixed frame 18 of the press unit 16 so as to be movable up and down. Between the mount 20 and the clamp frame 40, a compression coil spring 44 is disposed so as to surround each supporting rod 42. When the molds 12 and 14 are in the open state where no load is exerted on the spring 44, the clamp frame 40 is supported, by the spring 44, at a height level which is substantially the same as the highest section of the first mold 12. When the molds 12 and 14 are in the closed state, by contrast, the clamp frame 40 is pushed down by the second mold 14, whereby the coil spring 44 is compressed.

Also, at the lower surface, i.e., parting surface 46, of the outer peripheral portion of the second mold 14, a supporting member 48 with a hook-like cross section is provided for supporting a skin material which is a material for the molded article to be manufactured. It is necessary for the clamp frame 40 and the supporting member 48 to be disposed at positions which do not obstruct the opening and closing of the molds 12 and 14.

Figure 2:
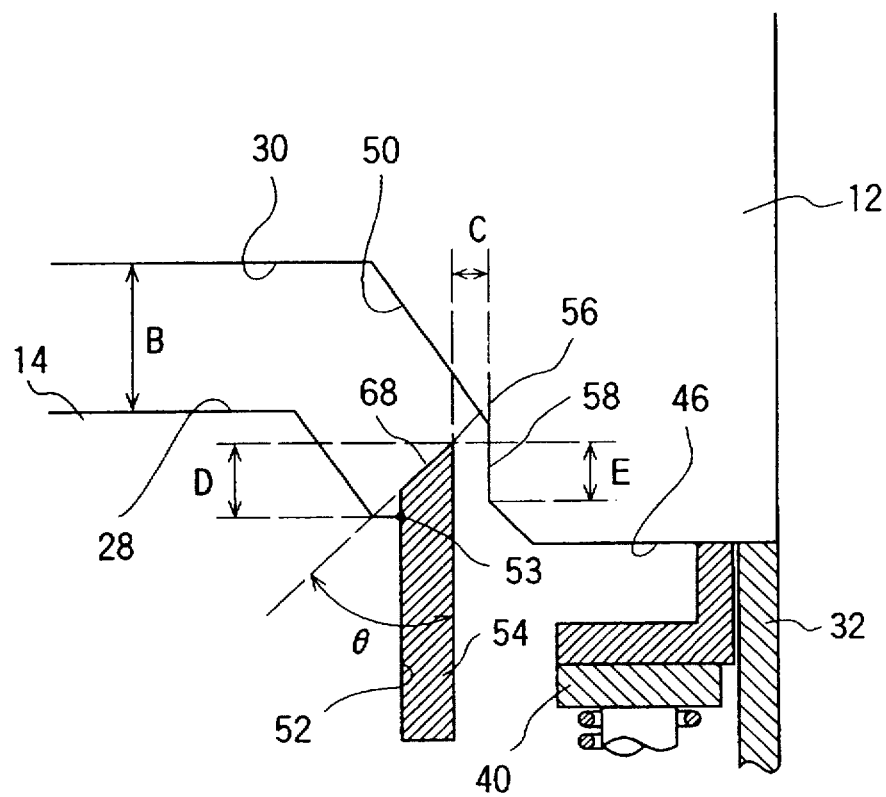
FIG. 2 is an enlarged schematic view showing the positional relationship among the first mold, the second mold, and the cutting blade at the time when the closing operation is completed.

The second mold 14 shown in FIG. 1 is a so-called female mold which has an indentation 50 whose bottom surface (upper surface in FIG. 1) becomes the cavity face 30, whereas the first mold 12 is a so-called male mold which is inserted into the second mold 14. An outer peripheral side surface 52 of this male mold 12 extends substantially vertically, while a cutting blade 54 for cutting off the fiber-reinforced thermoplastic resin sheet is attached to the outer peripheral side surface 52 so as to extend over the whole periphery thereof. As shown in FIG. 2, a cutting edge 56 of the cutting blade 54 is protruded above an upper edge 53 of the outer peripheral side surface 52 of the first mold 12 and directed to the cavity face 30 of the second mold 14. Also, the cutting blade 54 is positioned such that, when the second mold 14 is placed at the closed position, the upper portion of the cutting blade 54 is disposed with a predetermined horizontal clearance C with respect to an inner peripheral side surface 58 of the indentation 50 of the second mold 14. Further, the cutting blade 54 is positioned such that, when the second mold 14 is placed at the closed position, the cutting edge 56 of the cutting blade 54 is disposed with a predetermined vertical clearance with respect to the inner surface or cavity face of the second mold 14 so as not to be in contact therewith.

Figure 3:
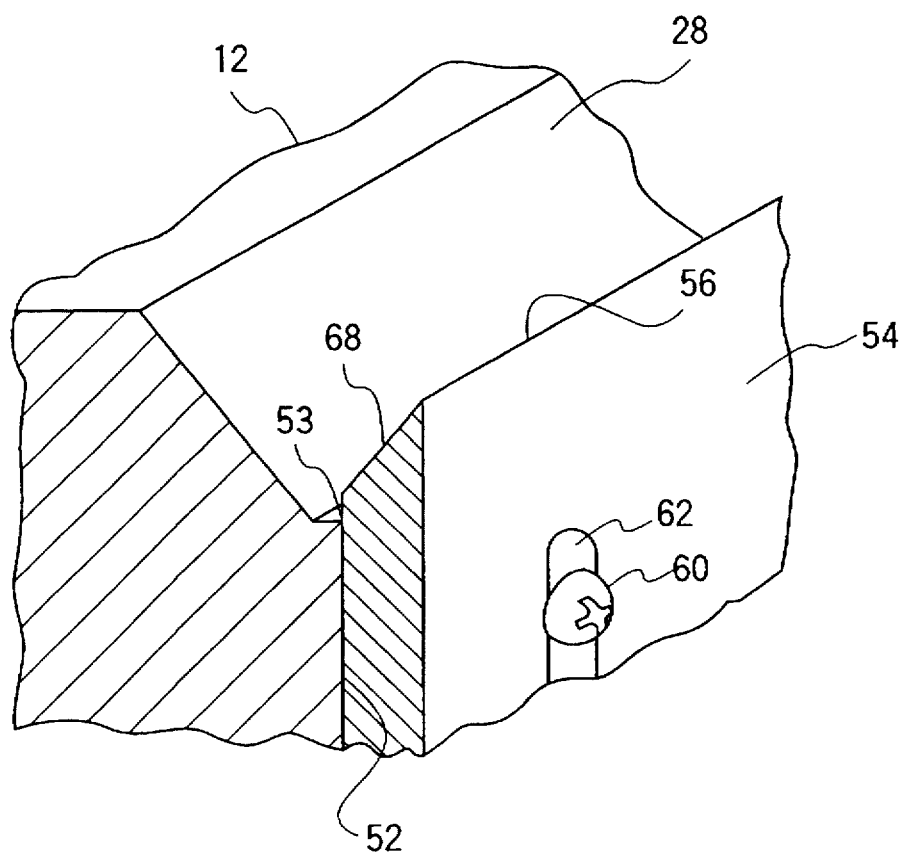
FIG. 3 is a partial perspective view showing a state of attachment of the cutting blade and the first mold to each other.

Though this cutting blade 54 may be unitedly provided with the first mold 12, it is preferable that the cutting blade 54 be detachably attached to the first mold 12 so as to be easily replaced when it is broken or its cutting edge 56 has become blunt. They may be attached together by any method as long as it can securely fix the cutting blade 54 to the outer peripheral side surface 52 of the first mold 12. In a preferred embodiment, as shown in FIG. 3, the cutting blade 54 is fixed by a screw 60. A hole 62 through which the screw 60 passes is formed as a hole elongated in the vertical direction such that the position of the cutting blade 54 can be adjusted. As the position is made adjustable in this manner, the cutting blade 54 can place the cutting edge 56 lower than the upper edge 53 of the outer peripheral side surface 52 of the first mold 12, except for the time at which the thermoplastic resin sheet is cut off, so as to protect the cutting edge 56. Also, the cutting blade 54 may be moved up and down by an actuator 64 such as a hydraulic unit disposed at the mount 20 of the fixed frame 18, for example.

Further, the cutting blade 54 may be heated and thermally insulated in order to prevent the cutting characteristic of the cutting edge 56 from deteriorating due to the fact that the thermoplastic resin in the thermoplastic resin sheet is cooled and solidified to be attached to the cutting edge 56. For this purpose, a heater 66 is disposed at the mount 20 of the fixed frame 18 in the depicted embodiment.

Also, while the side surface of the cutting blade 54 is preferably in parallel to the inner peripheral side surface 58 of the second mold 14, the lower portion of the side surface of the cutting blade 54 may be tilted so as to go away from the inner peripheral side surface 58 of the second mold 14 in order for the edge portion of the cut thermoplastic resin sheet to easily escape from the cutting blade 54.

In view of the cutting characteristic of the thermoplastic resin sheet, the cutting blade 54 shown in FIGS. 1 to 3 is formed as a single-edged type, i.e., a type in which only one side of the cutting edge portion is polished and tilted. The cutting edge 56 of this single-edged type cutting blade 54 is disposed inward with respect to the inner peripheral side surface 58 of the second mold 14. In other words, a tilted surface 68 of the cutting edge portion of the cutting blade 54 faces the center of the first mold 12. As shown in FIG. 2, cutting edge angle θ of the cutting blade 54 is appropriately selected according to the fiber in the thermoplastic resin sheet and the material of the cutting blade 54, while being normally within the range of 15° to 45° and preferably within the range of 25° to 35°. The cutting edge 56 tends to be chipped off or become blunt when the cutting edge angle θ is too small, whereas the thermoplastic resin sheet cannot be cut off when the cutting edge angle θ is too large. Though the shape of the cutting edge 56 in the blade length direction is not restricted in particular, it is typically linear as can be seen from FIG. 3.

The material of the cutting blade 54 preferably has such a hardness that the cutting edge 56 thereof does not easily become blunt due to friction with the fiber contained in the thermoplastic resin sheet when cutting the sheet. Normally, metal materials such as a steel having a Brinell hardness not smaller than 100, sintered materials such as ceramics, and the like are used.

Figure 4:
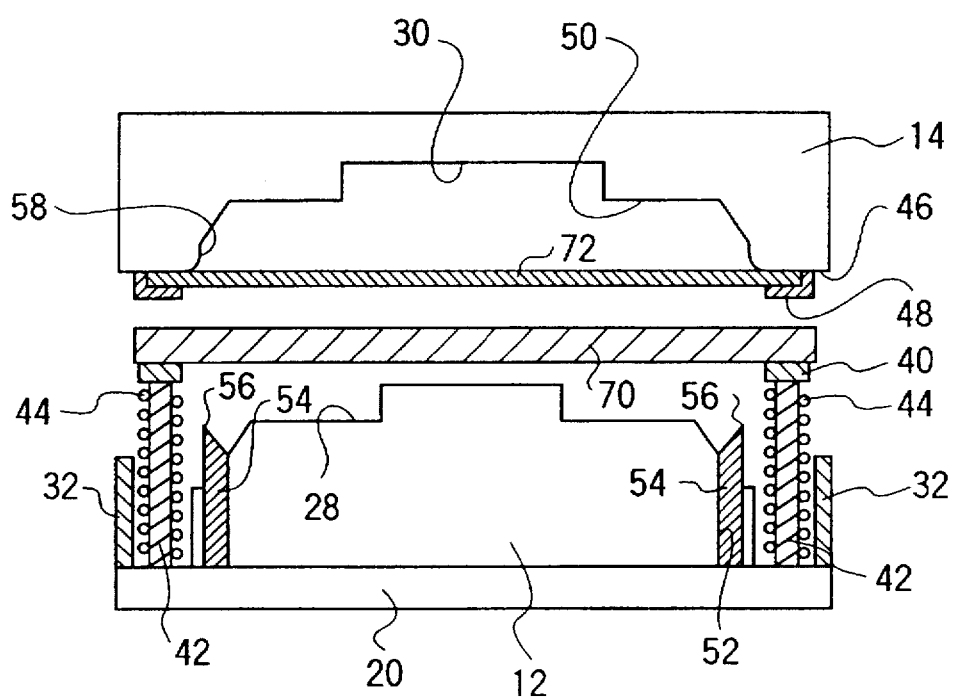
FIGS. 4 and 5 are schematic views respectively showing manufacturing steps of the method of the present invention in which the mold assembly shown in FIG. 1 is used for producing a fiber-reinforced thermoplastic resin molded article.
Figure 5:
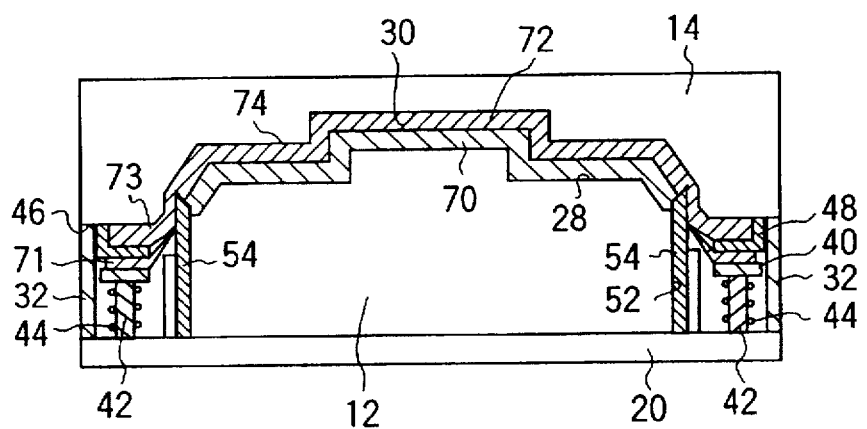
Figure 6:
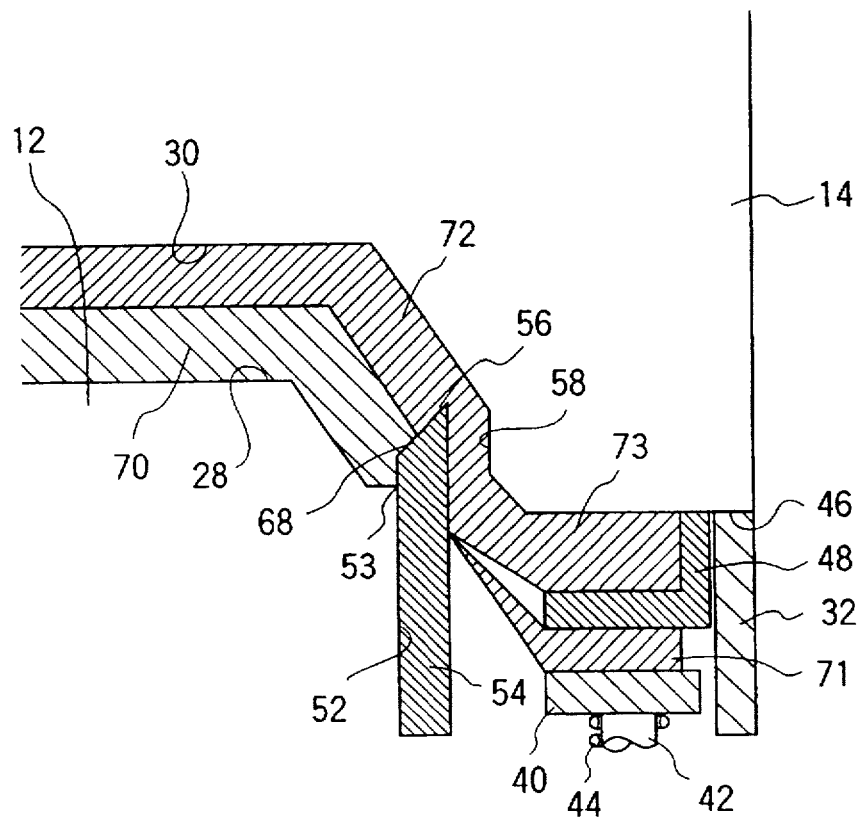
FIG. 6 is an enlarged schematic view showing an operation of the cutting blade.

In the following, a method for producing a fiber-reinforced thermoplastic resin molded article with a skin material, in which the above-mentioned mold assembly 10 is used, will be briefly explained with reference to FIG. 1 as well as FIGS. 4 to 5 which schematically show the operational states of the molds 12 and 14. According to the method of the present invention, as shown in FIG. 4, a preheated and expanded fiber-reinforced thermoplastic resin sheet 70 is disposed between the molds 12 and 14, which are in the open state, and mounted on the clamp frame 40, while a skin material 72 is supported by the supporting member 48 on the second mold 14. Then, the second mold 14 is moved to the closed position such that the fiber-reinforced thermoplastic resin sheet 70 and the skin material 72 are pressed between the respective cavity faces 28 and 30 of the molds 12 and 14, whereby they are laminated together (see FIG. 5). At this moment, the cutting edge 56 of the cutting blade 54 gnaws into and cuts off the thermoplastic resin sheet 70. Since there is an appropriate vertical clearance between the cutting edge 56 and the cavity face 30 of the second mold 14, on the other hand, the skin material 72 is not cut off. Thus, a molded article (FIG. 6) having a desired shape from which only the edge portion of the thermoplastic resin sheet has been cut off is obtained.

The method of the present invention will be explained in further detail. First, as materials for the molded article to be produced, appropriate fiber-reinforced thermoplastic resin sheet 70 and skin material 72 are provided.

Examples of the fiber-reinforced resin sheet 70 include a fiber-reinforced resin sheet formed by a laminate method and a fiber-reinforced resin sheet formed by a papermaking method (filtering method). The fiber-reinforced resin sheet formed by a laminate method is a sheet-like molding material which is obtained by a method comprising the steps of sticking a needle into a plurality of strings of strand-like reinforcing fibers so as to entangle the fibers with each other, thereby forming a mat-like strand reinforcing fiber; laminating a thermoplastic resin on thus obtained mat-like strand reinforcing fiber; and then heating and pressing the laminate. On the other hand, the fiber-reinforced resin sheet formed by a papermaking method is a sheet-like molding material which is obtained by a method comprising the steps of uniformly dispersing and mixing reinforcing fibers having a diameter of 1 to 50 m and a length of 1 to 50 mm and a thermoplastic resin powder in water so as to form a suspension; obtaining a non-woven material from thus formed suspension by filtering; and then heating and pressing thus obtained non-woven material. In the present invention, the fiber-reinforced resin sheet formed by a papermaking method, which is more suitable for manufacturing a porous fiber-reinforced thermoplastic resin molded article having a high expansion ratio, is preferably used. In this case, in order to take advantage of the light weight, which is a characteristic of the porous fiber-reinforced thermoplastic resin molded article, a fiber-reinforced resin sheet formed by a papermaking method with a weight per area of 1,600 g/m$^2$ or lower is more preferably used. Also, the rear side of such a sheet may be laminated with an airtight film or a film for preventing the sheet from being embossed with the fibers from the inside.

Examples of the reinforcing fiber used for such a fiber-reinforced thermoplastic resin sheet 70 include metal fibers such as stainless fiber, inorganic fibers such as glass fiber and carbon fiber, organic fibers such as aramide fiber, and mixed fibers thereof. In particular, glass fiber is most preferably used since it is relatively easily cut off by the depicted cutting blade 54 and a high reinforcing effect can be attained at a low cost. The surface of such a reinforcing fiber may be subjected to a sizing processing in order to improve its adhesion to the matrix resin during the manufacture of the fiber-reinforced thermoplastic resin sheet.

Also, examples of the matrix resin for the fiber-reinforced thermoplastic resin sheet 70 include thermoplastic resins which are normally used in extrusion molding, injection molding, press molding, and the like, for example, general thermoplastic resins such as polyolefin resins like polyethylene and polypropylene, polystyrene, acrylonitrile-styrene-butadiene copolymer, polyvinyl chloride, polyamide, polycarbonate, polyethylene terephthalate, polybutylene terephthalate, polyphenylene ether, and styrene-acrylonitrile copolymer; thermoplastic elastomers; mixtures thereof; polymer alloys using these thermoplastic resins; and their modified products. These resins may arbitrarily contain various compounding agents such as stabilizers, pigments, and fillers which are normally compounded therein.

The content of reinforcing fiber in the fiber-reinforced thermoplastic resin sheet 70 is appropriately selected according to the aimed object. Though fibers used normally have a diameter of 1 to 50 μm and a length of 1 to 50 mm, it is preferable that, in view of the reinforcing effect for the resulting molded article, the fibers have a diameter of 3 to 50 μm and a length of 3 to 50 mm. In general, as the reinforcing fiber content is smaller, the expansion ratio becomes smaller, thereby yielding a porous fiber-reinforced resin molded article with a lower porosity; while, as the reinforcing fiber content is greater, the expansion ratio becomes greater, thereby yielding a porous fiber-reinforced resin molded article with a higher porosity. Since the mechanical strength may be lowered or the adhesion to the skin material 72 may deteriorate when the content is too high, it normally lies within the range of 10 to 70% by weight.

The skin material 72 applied to the present invention is appropriately selected according to various purposes of use such as rendering of surface decoration, cushioning, thermal insulating properties, airtightness, and the like, while not being restricted in particular. Nevertheless, it is necessary for the skin material 72 to have a thermal resistance so as not to be melted or broken upon preheating. As the skin material 72, conventionally known skin materials made of materials such as various woven fabrics, knitted fabrics, non-woven fabrics, a sheet composed of a thermoplastic resin or thermoplastic elastomer, a foamed sheet of a thermoplastic resin or thermoplastic elastomer, or a laminate comprising at least two materials mentioned above may be used. In particular, a skin material comprising a sheet made of a thermoplastic elastomer as its surface layer and a foamed article of a thermoplastic resin or thermoplastic elastomer as its backing material is preferably used as the skin material since it is excellent in the surface appearance and has cushioning, while grain patterns, characters, and the like formed in a mold can be relatively easily transferred to the surface. The surface of the skin material 72 may be decorated beforehand with three-dimensional patterns such as grain patterns, printing, and the like.

As will be explained later, the skin material 72 and the fiber-reinforced thermoplastic resin sheet 70 are bonded together upon heat fusion of the rear side of the skin material 72 and the matrix resin of the fiber-reinforced thermoplastic resin sheet 70 which has been expanded upon preheating. Accordingly, the material of the skin material 72 itself or the backing sheet on the rear side thereof is desirably of the same kind as or structurally similar to the matrix resin of the fiber-reinforced thermoplastic resin sheet 70. Nevertheless, they may be different kinds of materials as long as they can be fused together by heat. Also, when their bonding effect by heat fusion is scarce due to their different kinds of materials or the like, for example, a hot-melt adhesive sheet may be attached to the rear side of the skin material before use. Also, according to circumstances, there may be used a skin material in which a film composed of two thermoplastic resin layers respectively meltable and unmeltable by the heat of the preheated fiber-reinforced thermoplastic resin sheet 70 is laminated on the rear side of the skin material by an adhesive or the like such that the meltable resin layer faces the outside.

When the skin material 72 is too thin, it is likely to be cut off by the cutting blade 54 together with thermoplastic resin sheet 70. Accordingly, it is normally preferable that the thickness of the skin material be not less than 0.3 mm. More preferably, for example, it is within the range of 0.5 to 3 mm in the case of non-woven fabrics and within the range of 0.3 to 1.5 mm in the case of thermoplastic elastomer sheets. Also, it is preferable for a skin material such as a thermoplastic resin foamed sheet which is easily cut off by the cutting blade 54 to be used not alone but as a laminate sheet which has been laminated beforehand with a skin material such as a thermoplastic resin sheet which is hard to be cut off by the cutting blade 54.

Here, though the skin material 72 is pressed together with the thermoplastic resin sheet 70 within the cavity space between the molds 12 and 14 upon a closing operation, the thermoplastic resin sheet 70 is normally compressed alone upon this pressing operation. Since the compression of the skin material 72 is little, the thickness thereof is selected without regard to the compression upon the pressing operation.

When appropriate fiber-reinforced thermoplastic resin sheet 70 and skin material 72 are provided, the thermoplastic resin sheet 70 is preheated by an appropriate means so as to be expanded in the thickness direction thereof.

Though the preheating temperature of the fiber-reinforced thermoplastic resin sheet 70 varies depending on the kind of the fiber-reinforced thermoplastic resin sheet used, in general, it is appropriately selected within a range which is not lower than the melting point of the matrix resin but lower than the decomposition point thereof. For example, in the case of the fiber-reinforced thermoplastic resin sheet in which a glass fiber is used as its reinforcing fiber and a polypropylene resin is used as its matrix resin, the preheating temperature is not lower than the melting temperature of the matrix resin and is preferably at 180° to 220° C. in general. When the preheating temperature is lower than this range, expansion characteristic may not be fully obtained or adhesion to the skin material may deteriorate. Above this range, by contrast, the fiber-reinforced thermoplastic resin sheet may deteriorate by heat or it may become hard to handle.

As a preheating method, it is preferable to use a method by which the thermoplastic resin sheet 70 can be uniformly heated to the inside thereof. Normally, a method employing a far infrared ray heating furnace is used.

Here, when the molds 12 and 14 are of a deep draw type, it is preferable that the skin material 72 be also preheated appropriately so as to be softened.

After the fiber-reinforced thermoplastic resin sheet 70 has been preheated to a desired temperature and expanded, it is supplied to between the first and second molds 12 and 14, which are in the open state, and appropriately mounted on the clamp frame 40 as shown in FIG. 4. It is desirable that this step be effected immediately after the preheating step so as to maintain the preheating temperature of the thermoplastic resin sheet 70 as much as possible. Also, the skin material 72 is supplied to between the first and second molds 12 and 14, which are in the open state, and supported by the supporting member 48 on the second mold 14. In the case where the skin material 72 has not been preheated, it is preferably supplied before the preheated thermoplastic resin sheet 70 is supplied. Normally, the skin material 72 and the thermoplastic resin sheet 70 are supplied so as to become wider than the respective cavity faces 28 and 30 of the molds 12 and 14.

The thermoplastic resin sheet 70 may be directly mounted on the first mold 12, and then the skin material 72 may be mounted thereon in an overlapping manner. When the thermoplastic resin sheet 70 and the skin material 72 are respectively supported by the clamp frame 40 and the supporting member 48 as depicted, however, wrinkles are prevented from being generated in the thermoplastic resin sheet 70 and the skin material 72. Also, when the supporting member 48 is configured so as to clamp an edge of the skin material 72 while being slidable in lateral directions, the supporting member 48 can adjust the tension of the skin material 72 clamped thereby. Similarly, though not depicted, a slidable clamp member may be disposed at the clamp frame 40 so as to adjust the tension of the thermoplastic resin sheet 70 clamped by this clamp member. As the degrees of tension of the thermoplastic resin sheet 70 and skin material 72 are adjusted in this manner, the state of sliding of the sheet 70 and skin material 72 into the cavity space can be adjusted, whereby a molded article can be obtained without wrinkles.

After the skin material 72 and the thermoplastic resin sheet 70 have been disposed at predetermined positions between the molds 12 and 14 in this manner, a closing operation of the molds 12 and 14 is started while the preheating temperature of the thermoplastic resin sheet 70 is maintained. In this closing step, the driving unit 26 for the press unit 16 is controlled so as to move the second mold 14 downward from the open position. When the parting face 46 of the second mold 14 (including an edge portion 73 of the skin material 72 and the supporting member 48) abuts to an edge portion 71 of the thermoplastic resin sheet 70 on the clamp frame 40, the thermoplastic resin sheet 70 and the skin material 72 are clamped between the clamp frame 40 and the second mold 14. As the second mold 14 is further continuously descended, the male first mold 12 urges the skin material 72 and the thermoplastic resin sheet 70 into the female second mold 14. Finally, the second mold 14 abuts to the stopper 32 and stops at the closed position. At this moment, the control unit 34 judges that the second mold 14 has reached the stopper 32 according to a signal from the position sensor 36 and stops actuating the driving unit 26. It is needless to mention that, without the aid of the stopper 32, the control unit 34 may be controlled solely based on the position signal from the position sensor 36 so as to stop the second mold 14 at the closed position. The gap, i.e., cavity clearance B, between the first and second molds 12 and 14 in the closed state substantially coincides with the thickness of the desired molded article. In other words, the cavity clearance B is set within a range in which it is smaller than the sum of the thickness of the thermoplastic resin sheet 70 expanded by preheating and the thickness of the skin material 72 but greater than the sum of the thickness of the thermoplastic resin sheet 70 before preheating and the thickness of the skin material 72. Accordingly, the fiber-reinforced thermoplastic resin sheet 70 and the skin material 72 are pressed between the first and second molds 12 and 14 under a desired closing pressure, whereby the fiber-reinforced thermoplastic resin sheet 70 and the skin material 72 are laminated by heat fusion except for their respective edge portions 71 and 73.

At the foregoing closing step, as the second mold 14 descends, the respective edge portions 71 and 73 of the fiber-reinforced thermoplastic resin sheet 70 and the skin material 72 are inserted between the cutting blade 54 and the inner peripheral side surface 58 of the second mold 14. Then, together with the progress of the closing operation, the cutting edge 56 of the cutting blade 54 proceeds into the thermoplastic resin sheet 70 while cutting through the sheet 70. When the second mold 14 reaches the closed position, as clearly depicted in FIG. 6, the cutting edge 56 of the cutting blade 54 reaches the lower surface of the skin material 72, thereby cutting off the thermoplastic resin sheet 70. Here, when the cutting blade 54 is attached to an appropriate position, it does not completely cut off the skin material 72 though it may cut through a part of the skin material 72 according to circumstances.

Now, with reference to FIG. 2 again, the length of the protrusion of the cutting edge 56 of the cutting blade 54, i.e., cutting blade height D, is appropriately selected according to the kinds, properties, thickness values of the skin material 72 and thermoplastic resin sheet 70, the shape of the mold cavity, or the like such that only the edge portion 71 of the thermoplastic resin sheet 70 can be suitably cut off, in particular, according to the shape of the mold cavity. In general, it is set within the range of 0.5 to 5 mm. When the cutting blade height D is too much, not only obtained is a molded article with an incomplete shape in which the skin material has also been cut off but also the cutting blade 54 tends to be broken when the thermoplastic resin sheet 70 is cut off. When it is too low, on the other hand, the thermoplastic resin sheet 70 may not be cut off or, if it can be cut off, a molded article with an incomplete shape in which a part of the edge portion 71 remains as a skirt may be obtained.

Also, as the closing operation of the molds 12 and 14 is started, the cutting edge 56 of the cutting blade 54 moves along the inner peripheral side surface 58 of the second mold 14 with a predetermined horizontal clearance C with respect to the inner peripheral side surface 58. Both the clearance C between the cutting edge 56 and the inner peripheral side surface 58 at the time of this movement and the moving length or overlapping amount (E) of the cutting blade 54 and the inner peripheral side surface 58 with respect to each other at the time when the closing operation is completed, greatly influence the cutting characteristic of the thermoplastic resin sheet 70. Accordingly, it is important for the mold assembly 10 of the present invention to appropriately select these values such that the thermoplastic resin sheet 70 can be cut off alone according to the kinds, properties, thickness values, and the like of the skin material 72 and thermoplastic resin sheet 70.

It is necessary for the clearance C to be smaller than the thickness of the skin material 72. The clearance C is appropriately selected according to the kinds, properties, thickness values, and the like of the skin material 72 and thermoplastic resin sheet 70 or, in particular, the hardness, thickness, and the like of the skin material 72. It is normally within the range of 0.1 to 3 mm, preferably from 0.1 to 1.5 mm, and more preferably from 0.2 to 1 mm. The thermoplastic resin sheet 70 cannot be cut off when the clearance C is too much, whereas not only the thermoplastic resin sheet 70 but also the skin material 72 is cut off when the clearance C is too small.

Also, during the time when the cutting blade 54 is moved along the inner peripheral side surface 58 of the second mold 14, the clearance C is preferably constant. Therefore, at least a portion of the inner peripheral side surface 58 of the second mold 14 which overlaps the cutting blade 54 is preferably in a direction in parallel to the opening and closing direction of the mold, i.e., in the vertical direction.

Though the clearance C varies upon each molding operation according to an actuation error of the press unit 16 in the opening and closing operation of the molds 12 and 14, such an actuation error in the normal press unit 16 is less than ±0.1 mm. Accordingly, such a variation of the clearance C does not normally affect the cutting characteristic of the thermoplastic resin sheet 70.

The moving length E is appropriately selected according to the kinds, properties, thickness values, and the like of the skin material 72 and thermoplastic resin sheet 70. Though the moving length E is normally not lower than 0.1 mm, since a scratch may occur on the surface of the skin material 72 after molding due to the friction with respect to the inner peripheral side surface of the second mold 14, it is preferably within the range of 0.1 to 5 mm and more preferably within the range of 0.5 to 3 mm. Also, the thermoplastic resin sheet cannot be cut off when the moving length E is too small.

Figure 7:
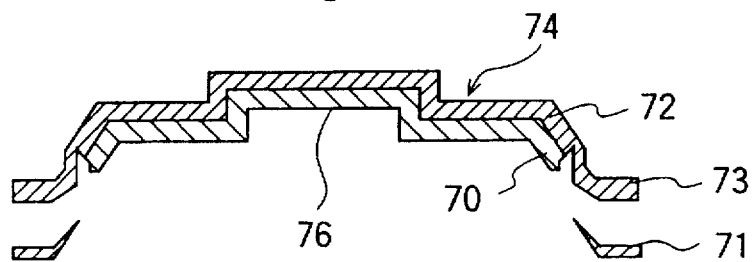
FIG. 7 is a schematic view showing a fiber-reinforced thermoplastic resin molded article manufactured with the mold assembly shown in FIG. 1.

After the closing operation has been completed and the cutting of the thermoplastic resin sheet 70 has been terminated, the molds 12 and 14 are cooled. Then, when the second mold 14 is returned to the open position, a porous fiber-reinforced thermoplastic resin molded article 74 with a skin material can be taken out as a final product. FIG. 7 is a schematic view of the molded article 74 thus completed. FIG. 7 shows a state in which the skin material 72 is laminated together with a base portion 76 at which the thermoplastic resin sheet 70 has been compression-molded, while only the edge portion 71 of the thermoplastic resin sheet 70 is cut off with no skin material 72 being cut off.

Thus, in accordance with the present invention, without the aid of the cutting planar article, the porous thermoplastic resin molded article 74 with a skin material from which only the unnecessary portion 71 of the thermoplastic resin sheet 70 has been cut off can be easily manufactured.

Though a preferable embodiment of the present invention is explained in the foregoing, it is needless to mention that the present invention should not be restricted thereto. For example, while the skin material 72 is supported by the supporting member 48 in the above-mentioned embodiment, any type of supporting members can be used as long as they do not obstruct the opening and closing operation of the molds 12 and 14. Simply, a double-sided adhesive tape may be used for supporting the skin material.

Also, though the cutting blade is typically provided at the whole periphery of the outer peripheral side surface 52 of the first mold 12; when the edge portion 71 of the thermoplastic resin 70 should be intentionally left in the aimed molded article, the cutting blade may not be provided at the section of the outer peripheral side surface 52 of the first mold 12 corresponding thereto.

Figure 11:
FIGS. 8 to 11 are schematic views respectively showing other examples of the cutting blade.
Figure 8:
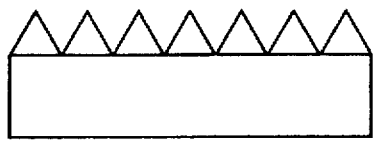
Figure 9:
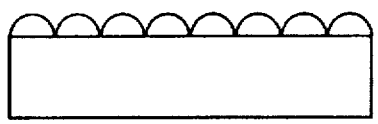
Figure 10:
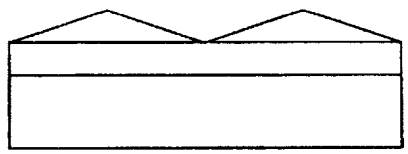

Also, the shape of the cutting edge of the cutting blade in the blade length direction is not restricted in particular. For example, depending on the shape of the mold cavity, there is a case where the thermoplastic resin sheet cannot be cut off alone with a cutting edge having a linear shape such as that shown in FIG. 3. In this case, the cutting edge of the cutting blade may partially have a special shape, thereby partially changing the cutting blade height. Examples of such a special shape include a sawtooth shape shown in FIG. 8, a wave type shown in FIG. 9, and a swell type shown in FIG. 10. Further, though the cutting blade 54 in the above-mentioned embodiment is of a single-edged type, i.e., a type in which only one side of the cutting edge portion is polished and tilted, it may be of a double-edged type such as that shown in FIG. 11. Further, the position to which the cutting blade 54 is attached may be appropriately changed according to the portion of the thermoplastic resin sheet 70 to be cut, the shapes of the molds 12 and 14, and the position of the inner peripheral side surface 58 of the second mold 14. Also, the cutting blade may not only be directly attached onto the first mold 12 but indirectly by way of the mount 20 to which the first mold 12 is fixed, the fixed frame 18, or the like. In the case of the single-edged type cutting blade 54, though the cutting edge 56 is depicted as being positioned inward with respect to the inner peripheral side surface 58 of the second mold 14, the cutting edge 56 may be positioned outward with respect to the outer peripheral side surface 52 of the first mold 12.

Though the second mold 14 is movable in the mold assembly 10 in the above-mentioned embodiment, the first mold 12 may be made movable while the second mold 14 is made stationary, or both of the first and second molds 12 and 14 may be made movable. Also, the first and second molds may be arranged in a row in the horizontal direction, and one or both of the molds may be made movable in the horizontal direction so as to perform opening and closing operations.

EXAMPLES

In the following, the present invention will be explained in further detail with reference to examples, which by no means restrict the present invention.

Example 1

While the mold assembly (10) shown in FIG. 1 was used, a porous fiber-reinforced thermoplastic molded article (74) laminated with a skin material was manufactured by the following method.

The cutting blade (54) was made of a steel having a Brinell hardness of 200 with a single-edged type cross section, while its cutting edge (56) was set to have a point angle of 30°. This cutting blade (54) was fixedly screwed onto the outer peripheral side surface (52) of the first mold (12) such that the cutting edge (56) was opposed to the cavity face (30) of the second mold (14) while the cutting edge (56) was positioned inward with respect to the inner peripheral side surface (58) of the second mold (14). The cutting blade height (D) from the upper edge (53) of the outer peripheral side surface (52) of the first mold (12), i.e., from the outer rim of the cavity face (28) was set to 1.5 mm throughout the outer peripheral side surface (52); the clearance (C) between the cutting edge (56) of the cutting blade (54) and the inner peripheral side surface (58) of the second mold (14) was set to 0.5 to 0.8 mm; and the overlapping amount (E) at the time when the molds were completely closed was set to 2 mm.

The cavity clearance (B) between the molds (12 and 14) when they were completely closed was set to 6.5 mm, whereas the position for completing the closing operation was controlled with the stopper (32).

While the molds (12 and 14) were placed in the open state as shown in FIG. 4, an edge portion of a skin material (72) was held as being sandwiched between the skin material supporting member (48) and the parting surface (46) of the second mold (14). As the skin material (72), a laminate sheet (with a thickness of 3.5 mm; manufactured by Kyowa Leather Cloth Co., Ltd.) in which an upper layer of polyvinyl chloride (with a thickness of 0.5 mm) and a lower layer of polypropylene foamed sheet (PPAM 25030, with a thickness of 3.0 mm) had been laminated together beforehand was used.

Thereafter, a fiber-reinforced thermoplastic resin sheet (70) (glass-fiber-reinforced polypropylene sheet with a glass fiber content of 45% by weight, a mean glass fiber length of 25 mm, a weight per area of 1,200 g/m$^2$, and a thickness of 0.94 mm; manufactured by K-plasheet Corporation) was preheated to 210° C. in a far infrared ray heating furnace so as to be expanded in the thickness direction thereof by six times and then, while in the preheated state, mounted on the clamp frame (40). Immediately thereafter, the second mold (14) was descended so as to close the molds together, thereby completing the closing operation.

After cooling, the molds (12 and 14) were opened and the resulting molded article (74) was taken out. It was seen that, without the skin material (72) having been cut off, the thermoplastic resin sheet (70) had been cut off from the whole outer peripheral portion of the molded article (74). Also, the thickness of the base portion (76) of the molded article (74) was 2.8 mm, while the attachment of the skin material (72) and the base portion (76) with respect to each other was favorable.

Example 2

The operation was the same as that of Example 1 except that the skin material (72) was a non-woven fabric having a thickness of 1.7 mm and that the cavity clearance (B) at the time when the molds had been completely closed was set to 6 mm.

In the resulting molded article (74), without the skin material (72) having been cut off, the thermoplastic resin sheet (70) had been cut off from the whole periphery of the molded article (74). Also, the thickness of the base portion (76) of the molded article (74) was 4.4 mm, while the attachment of the skin material (72) and the base portion (76) with respect to each other was favorable.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No.191423/1995 filed on Jul. 27, 1995 is hereby incorporated by reference.

What is claimed is:

1. A mold assembly for pressing a fiber-reinforced thermoplastic resin sheet and a skin material, while said fiber-reinforced thermoplastic resin sheet and said skin material overlap each other, so as to produce a fiber-reinforced thermoplastic resin molded article laminated with a skin material having a predetermined shape, said mold assembly comprising:

a first mold having a first cavity face which is to be abutted to said fiber-reinforced thermoplastic resin sheet;

a second mold having an indentation whose bottom surface forms a second cavity face to which said skin material is to be abutted and forming, at a closing operation, a cavity space between said first and second cavity faces as said first mold is inserted into said indentation;

a driving unit, connected to at least one of said first and second molds, for reciprocating the mold connected thereto between an open position where said first and second molds are in an open state and a closed position where said molds are in a closed state; and a cutting blade, attached to an outer peripheral side surface of said first mold, having a cutting edge opposed to said second cavity face of said second mold, said cutting edge being relatively moved, at the closing operation, along an inner peripheral side surface of said second mold with a predetermined clearance with respect to said inner peripheral side surface.

2. A mold assembly according to claim 1, wherein said clearance between said cutting edge of said cutting blade and said inner peripheral side surface of said second mold at the closing operation is not greater than a thickness of the skin material applied thereto.

3. A mold assembly according to claim 1, wherein said clearance is 0.1 to 3 mm.

4. A mold assembly according to claim 1, wherein said cutting edge of said cutting blade is protruded from an upper edge of said outer peripheral side surface of said first mold toward said second cavity face of said second mold by 0.5 to 5 mm.

5. A mold assembly according to claim 1, wherein a portion in which said blade and said inner peripheral side surface of said second mold overlap each other when said mold connected to said driving unit is disposed at said closed position has a length of 0.1 to 5 mm along a direction of opening and closing of the molds.

6. A mold assembly according to claim 1, wherein said cutting blade is made of a metal material having a Brinell hardness of not less than 100.

7. A mold assembly according to claim 1, wherein said cutting blade is made of a sintered material.

8. A mold assembly according to claim 1, wherein said cutting blade has a cutting edge angle of 15 to 45 degrees.

9. A mold assembly according to claim 1, wherein said cutting blade has a single edge, said cutting edge of said cutting blade being disposed inward with respect to said inner peripheral side surface of said second mold.

10. A mold assembly according to claim 1, further comprising heating means for heating said cutting blade.

11. A mold assembly according to claim 1, further comprising a member for supporting said thermoplastic resin sheet.

12. A mold assembly according to claim 1, further comprising a member for supporting said skin material.

13. A mold assembly according to claim 1, wherein said first mold is stationary and said second mold is disposed above said first mold so as to be able to reciprocate in a vertical direction.

14. A mold assembly according to claim 13, further comprising a member on which said thermoplastic resin sheet is mounted, said member being disposed around said first mold.

15. A mold assembly according to claim 14, wherein said member is adapted to abut to an outer peripheral portion of said second mold and movable together with a movement of said second mold.

16. A mold assembly according to claim 13, wherein said second mold has a member for supporting said skin material, said member being disposed at a lower surface of an outer peripheral portion of said second mold.

17. A mold assembly for pressing a fiber-reinforced thermoplastic resin sheet and a skin material, while said fiber-reinforced thermoplastic resin sheet and said skin material overlap each other, so as to produce a fiber-reinforced thermoplastic resin molded article laminated with a skin material having a predetermined shape, said mold assembly comprising:

a first mold having a first cavity face which is to be abutted to said fiber-reinforced thermoplastic resin sheet;

a second mold having an indentation whose bottom surface forms a second cavity face to which said skin material is to be abutted and forming, at a closing operation, a cavity space between said first and second cavity faces as said first mold is inserted into said indentation;

a driving unit, connected to at least one of said first and second molds, for reciprocating the mold connected thereto between an open position where said first and second molds are in an open state and a closed position where said molds are in a closed state; and a cutting blade which is attached to said first mold so as to be postionally adjustable, said cutting blade having a cutting edge opposed to said second cavity face of said second mold, said cutting edge being relatively moved, at the closing operation, along an inner peripheral side surface of said second mold with a predetermined clearance with respect to said inner peripheral side surface.

18. A mold assembly for pressing a fiber-reinforced thermoplastic resin sheet and a skin material, while said fiber-reinforced thermoplastic resin sheet and said skin material overlap each other, so as to produce a fiber-reinforced thermoplastic resin molded article laminated with a skin material having a predetermined shape, said mold assembly comprising:

a first mold having a first cavity face which is to be abutted to said fiber-reinforced thermoplastic resin sheet;

a second mold having an indentation whose bottom surface forms a second cavity face to which said skin material is to be abutted and forming, at a closing operation, a cavity space between said first and second cavity faces as said first mold is inserted into said indentation;

a driving unit, connected to at least one of said first and second molds, for reciprocating the mold connected thereto between an open position where said first and second molds are in an open state and a closed position where said molds are in a closed state; and a cutting blade which is attached to said first mold, said cutting blade having a cutting edge opposed to said second cavity face of said second mold, said cutting edge being relatively moved, at the closing operation, along an inner peripheral side surface of said second mold with a predetermined clearance with respect to said inner peripheral side surface to an outer peripheral side surface wherein a portion of said cutting blade opposite to said cutting edge is tilted in a direction departing from said cutting edge so as to go away from said inner peripheral side surface of said second mold.

* * * * *

UNITED STATES PATENT AND TRADEMARK OFFICE
CERTIFICATE OF CORRECTION

PATENT NO. : 5,759,594
DATED : June 2, 1998
INVENTOR(S) : Syohei Masui, et al

It is certified that error appears in the above-identified patent and that said Letters Patent is hereby corrected as shown below:

On the title page, item [75], delete the following:
"Yuji Kobayashi, Chiba; Katsuhiro Nagayama, Chiba; Masami Fujimaki, Chiba;".

Signed and Sealed this

Ninth Day of February, 1999

Attest:

Attesting Officer

*Acting Commissioner of Patents and Trademarks*